R. A. HARRIS.
ADVERTISING APPARATUS.
APPLICATION FILED MAY 6, 1911.
1,008,260.
Patented Nov. 7, 1911.
4 SHEETS—SHEET 3.
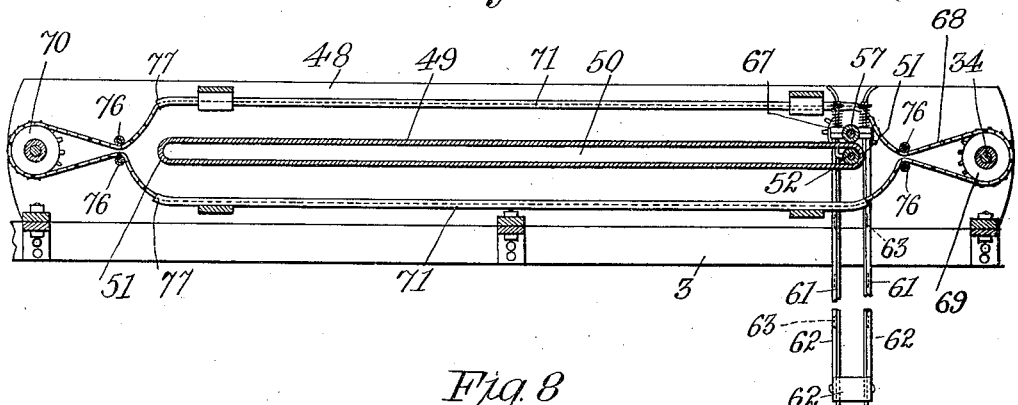
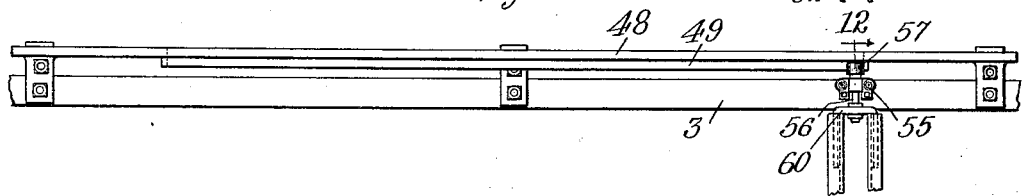
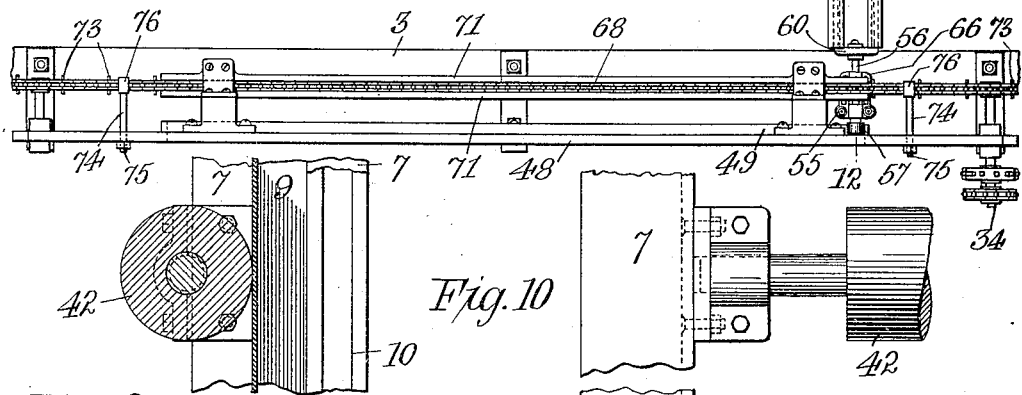
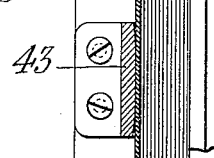

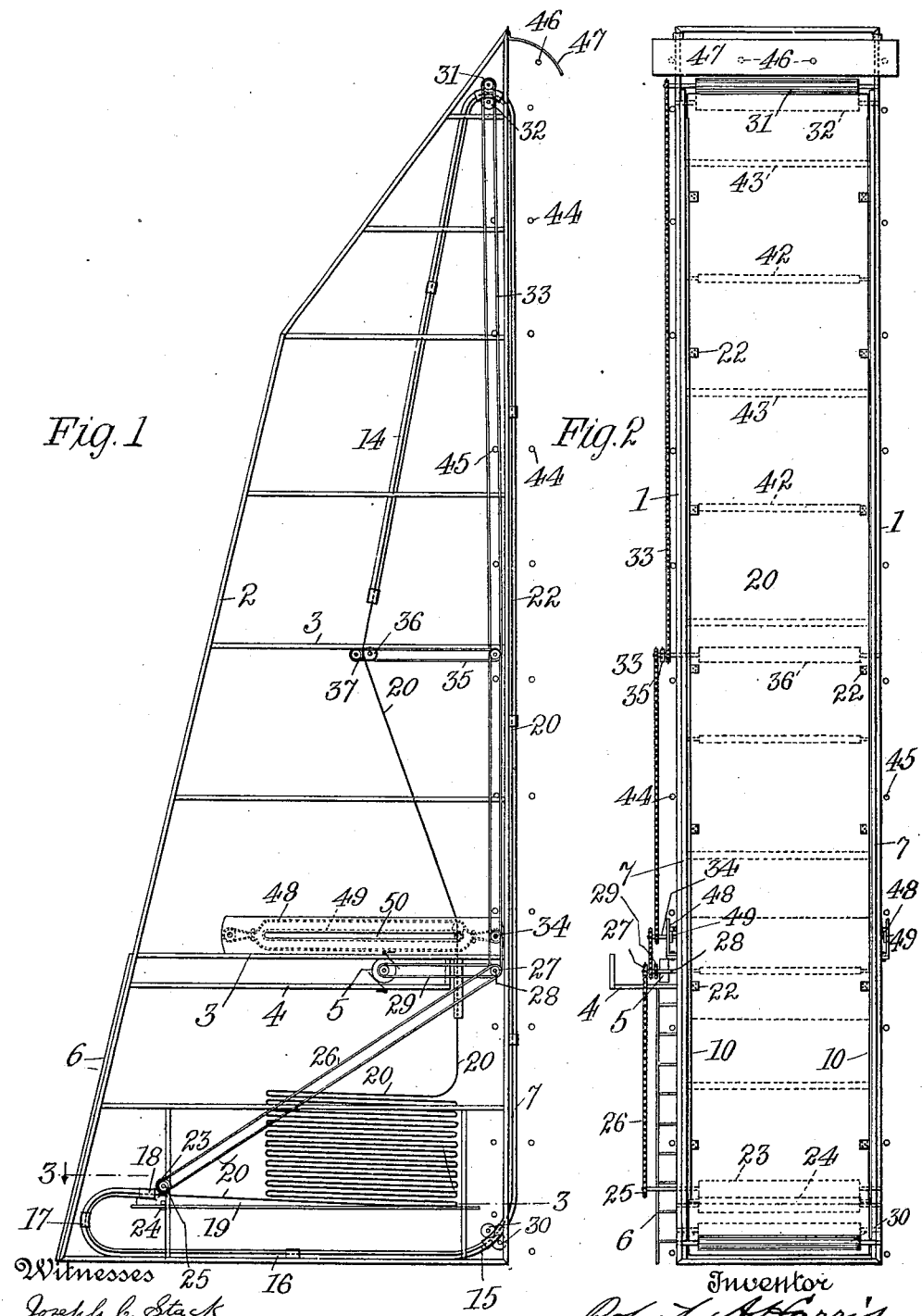

R. A. HARRIS.
ADVERTISING APPARATUS.
APPLICATION FILED MAY 6, 1911.
1,008,260.
Patented Nov. 7, 1911.
4 SHEETS—SHEET 4.
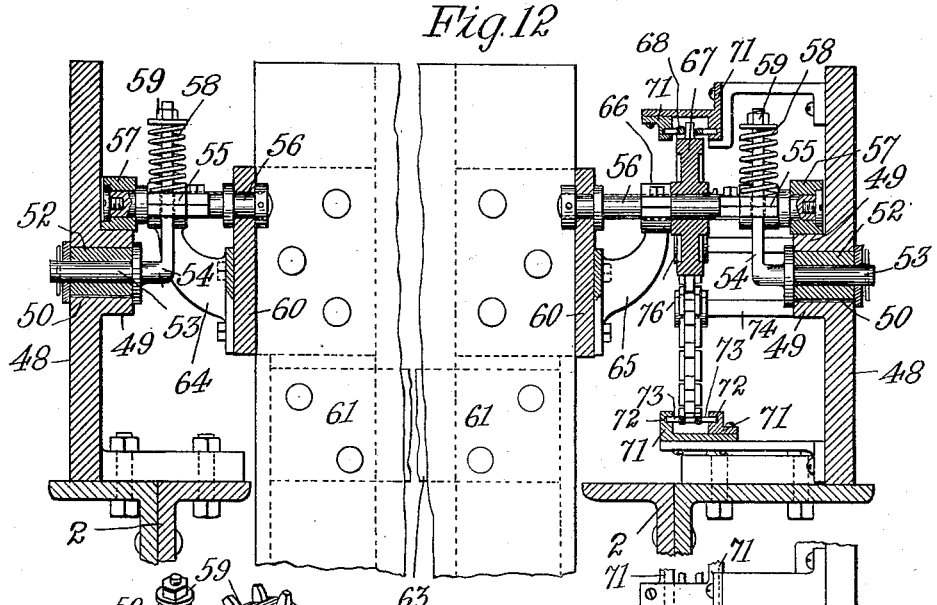
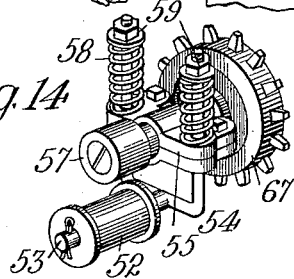
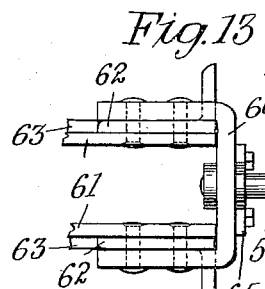
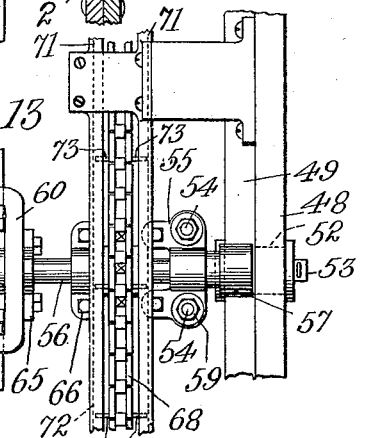
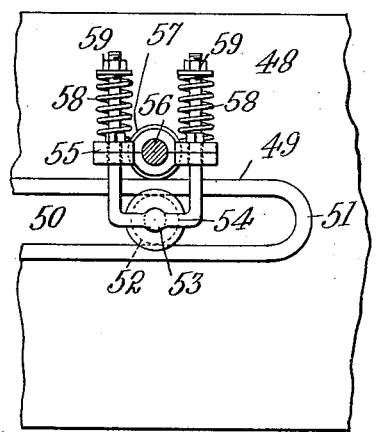
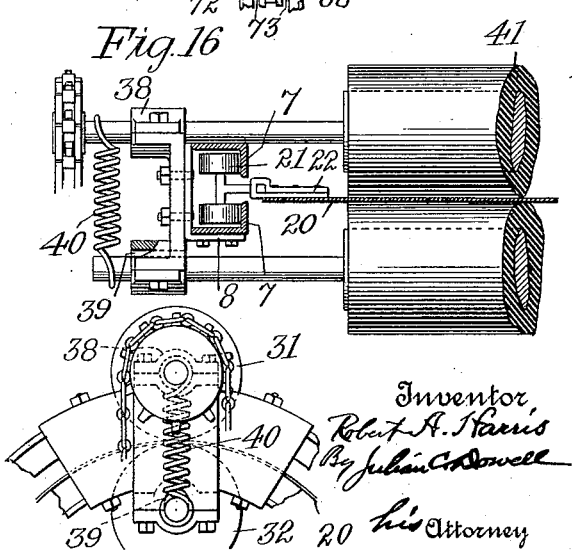

UNITED STATES PATENT OFFICE.

ROBERT ATWELL HARRIS, OF WELDON, NORTH CAROLINA, ASSIGNOR OF ONE-THIRD TO WIRT HENRY CRAWFORD, OF RICHMOND, VIRGINIA.

ADVERTISING APPARATUS.

1,008,260.  Specification of Letters Patent.  Patented Nov. 7, 1911.

Application filed May 6, 1911. Serial No. 625,599.

*To all whom it may concern:*

Be it known that I, ROBERT A. HARRIS, a citizen of the United States, residing at Weldon, in the county of Halifax and State of North Carolina, have invented certain new and useful Improvements in Advertising Apparatus, of which the following is a specification.

This invention relates to advertising apparatus and has special reference to that type of devices in which a continuous curtain or flexible strip is mounted in a suitable framework and actuated continuously or at regular intervals to display advertisements painted or otherwise formed upon or affixed to the face thereof. These advertising devices are in common use in cities upon the roofs of tall buildings and are illuminated to attract attention to the advertisements at night.

The object of my invention is to provide an advertising apparatus in which a comparatively long advertising curtain may be mounted upon a relatively small frame and automatically moved to bring the advertisements successively into view.

A secondary object of the invention is to provide a construction which will be strong and durable and which will operate easily and effectually while composed of few parts so that there will be slight liability of the mechanism to get out of order.

These stated objects and other incidental objects, which will appear as the description of the invention proceeds, are attained in the use of the mechanism illustrated in the accompanying drawings and the invention resides in certain novel features which are hereinafter first fully described and then more particularly pointed out in the appended claims.

Figure 3:
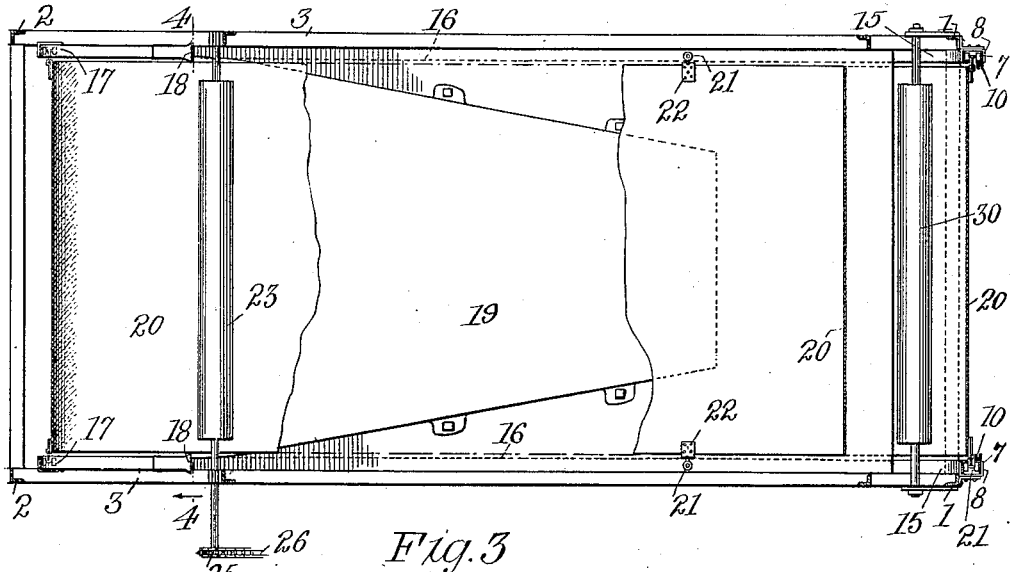
Figure 4:
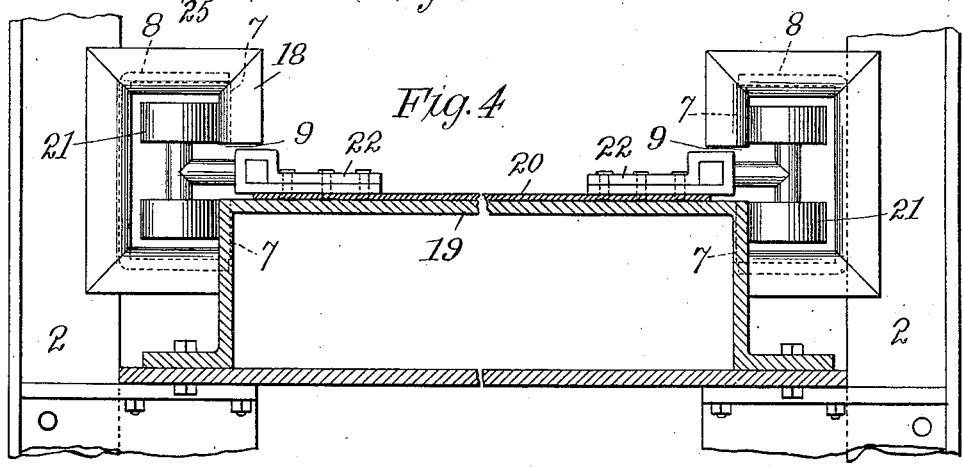
Figure 5:
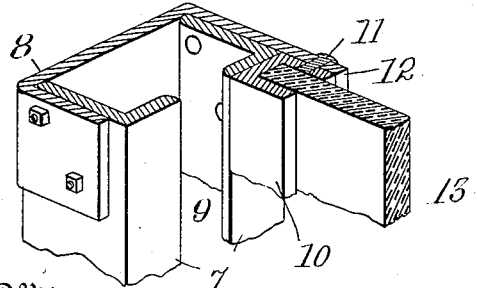
Figure 6:
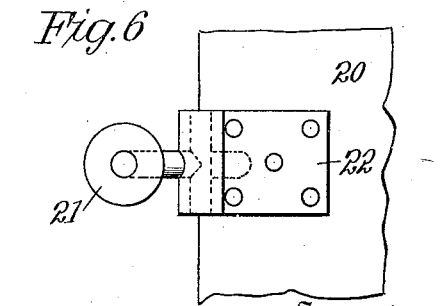

In the drawings, Figure 1 is a side elevation of an advertising apparatus embodying my improvements. Fig. 2 is a front elevation of the same. Fig. 3 is a horizontal section taken on the line 3—3 of Fig. 1. Fig. 4 is a transverse vertical section taken on the line 4—4 of Fig. 3. Fig. 5 is a detail sectional perspective showing the construction of the frame and track for supporting and guiding the curtain or advertising strip. Fig. 6 is a detail plan view of one of the guiding rollers carried by the curtain. Fig. 7 is a sectional elevation of the carriage and the guide constituting the folder for the curtain. Fig. 8 is a plan view of the same. Fig. 9 is a detail vertical sectional view of a portion of the supporting frame. Fig. 10 is a front elevation of the device shown in Fig. 9. Fig. 11 is a detail perspective view of a yoke employed in connection with the folder mechanism. Fig. 12 is an enlarged vertical section taken on the line 12—12 of Fig. 8. Fig. 13 is a detail plan view of a portion of the mechanism shown in Figs. 8 and 12. Fig. 14 is a detail perspective view of the guide roller for holding the folder carriage to its track showing the parts of the same and the parts immediately adjacent thereto in the relative positions they occupy when at work. Fig. 15 is a detail elevation of the device shown in Fig. 14, illustrating the same in position upon the guide or track. Fig. 16 is an enlarged detail sectional view showing the mounting of the presser rollers by which the curtain is maintained in its proper taut condition and by which motion is imparted to the curtain. Fig. 17 is an elevation of the presser rollers at the upper end of the main track.

In carrying out my invention, I erect upon the roof of a building or other fixed support, a frame consisting of uprights 1, braces 2, and cross-bars 3 connecting the said uprights and braces, these parts preferably being constructed of angle-iron. Upon one side of the frame thus provided I secure a platform 4 upon which is mounted a motor 5 which will preferably be an electric motor receiving current from any convenient plant. A ladder 6 is provided at the rear of the frame leading to the platform so that the motor may be easily accessible when it is necessary to clean or repair the same. The uprights 1 have secured to their opposed faces a track preferably consisting of a pair of angle-irons 7 connected at intervals by brackets 8 and having their flange members extending toward each other but terminating short of each other to provide a slot or opening 9 through which the guides of the advertising curtain may pass. Channel strips 10 are placed against the inner faces of the angle-irons 7 and are secured in place by rivets or other fastenings 11 inserted through extensions 12 of the brackets 8, as shown most clearly in Fig. 5. These channel strips constitute sashes or holders in which a glass or other transparent covering 13 may be secured, the said covering extending along the front of the frame so as to permit the advertisements to be easily read and at the same time protect the curtain or flexible strip from the force of the wind or other elements.

The track, consisting of the angle-irons 7, extends the full height of the frame and at the upper end thereof is curved to the rear and then extends downwardly and rearwardly, as shown at 14, and terminates at about the vertical center of the frame. The lower portion of the track curves rearwardly as shown at 15 and then extends across the bottom of the frame to the rear side thereof as shown at 16, the rear extremity of the track being carried upwardly in a semicircular turn 17 so as to terminate, as shown at 18, over a shelf 19 arranged near the bottom of the frame.

It is to be understood that the track is duplicated at the two sides of the frame and the lower terminals 18 are flared somewhat, as shown most clearly in Figs. 3 and 4, so as to facilitate the entrance into the track and the proper engagement therewith of the guide rollers attached to the edges of the curtain or flexible strip. The shelf 19 is supported rigidly by the main frame in any convenient or preferred manner and furnishes a support for the folded portion of the strip, as shown in Fig. 1. This shelf is of a wedge-like formation and its edges or sides diverge toward the terminals 18 of the track and also gradually increase in height in the same direction, the forward extremity of the shelf merging into the upper surface of the portion of the frame upon which it is secured.

The curtain or advertisement displaying strip 20 is formed of textile material, preferably of stout canvas, and is folded upon the shelf 19 by means presently described, so as to lie in superposed plies, as shown in Fig. 1. At intervals along the edges of the curtain I secure guide rollers 21 which are attached to the curtain by leather straps or other fastening means indicated at 22, and these rollers, as shown clearly in Fig. 4, ride upon the inner faces of the track so as to hold the curtain stretched between the two tracks and consequently hold the exposed portion of the curtain smooth throughout its extent so that the advertisements may be legibly displayed.

To impart motion to the curtain a driving roller 23 is mounted upon the frame adjacent the terminals 18 of the track and extends between the same, as shown most clearly in Fig. 3, the said roller coacting with the presser roller 24 located below the curtain to exert sufficient pressure upon the curtain to draw the lowermost ply or fold thereof from beneath the superposed plies or folds and into position between the tracks when the roller is rotated. The roller 23 is provided with a sprocket wheel 25 on the end of its axle or shaft which is connected by a sprocket chain 26 with a similar sprocket wheel 27 on the end of a shaft 28 mounted upon the frame near the front side of the same, and driven from the motor 5 through a sprocket chain or similar connection 29. Presser rollers 30 are provided near the lower turn 15 of the track so as to guide the curtain around the said turn and similar rollers or curved guide plates may be provided around the other curves of the track to prevent sagging of the curtain in passing around said curves, as will be readily understood. At the upper ends of the tracks I provide similar pressing and feeding rollers 31 and 32 which are driven through sprocket gearing 33 from a countershaft 34 which in turn is connected with the shaft 28, as shown in Figs. 1 and 2. The gearing 33 is also connected by a sprocket chain 35 with presser and feeding rollers 36 and 37 supported upon the frame adjacent and below the upper terminals of the tracks and bearing upon the opposite faces of the curtain, as clearly shown, so as to aid in feeding the same through the apparatus. It will be readily seen that by providing these presser and feeding rollers at various points along the path followed by the curtain and holding them in intimate contact with the curtain, I am enabled to positively feed the curtain through the apparatus so as to display the advertisements thereon smoothly and effectually.

In order to permit the rollers to automatically accommodate varying thicknesses of curtain and at the same time maintain the proper contact with the same I mount one roller of each pair in a fixed bearing as indicated at 38 in Fig. 16, while the other roller is mounted slidably in its bearing as shown at 39, the axles and shafts of the two rollers being connected by a spring 40 so that they will automatically and constantly draw together to engage the opposed faces of the curtain.

The rollers are preferably constructed of some elastic material, such as rubber, as shown at 41, so that while they will effectually engage the curtain so as to feed the same they will at the same time avoid injury to the curtain or to any matter upon the same.

As before stated, the cover 13 will protect the curtain from the force of the wind or other elements so that the curtain will not be easily destroyed. To further support the curtain and prevent its tearing under the force of high winds I provide alternately at certain intervals along the uprights 1, series of rollers 42 and bars or slats 43 against which the curtain bears in its upward travel so as to be sustained in its movement and thoroughly reinforced.

To illuminate the curtain electric lights, indicated diagrammatically at 44 and 45, are arranged along the upright portion of the frame either in front or in rear of the curtain or at both the front and the rear, and the slats 43 and rollers 42 will be spaced apart at sufficient intervals to provide for a clear or uninterrupted display of any advertisement upon the curtain. It will be readily seen that providing the lights in rear of the curtain as well as in front of the same permits me to illuminate the curtain solely in front or solely in the rear or in front and in rear alternately and thereby add to the attractiveness of the device and increase its value as an advertising medium, obtaining the best results under all conditions. I also provide one or more lights 46 at the upper end of the frame and a canopy 47 is secured to the frame and extends over these lights so as to shield the same, as shown.

At an intermediate point of the height of the frame, and preferably just above the motor supporting platform, I provide at the opposite sides of the frame, guides or tracks consisting of longitudinally slotted bars or plates 48 having flanges 49 on their inner faces extending around the slots 50 and constructed with continuous curved ends 51. Rollers 52 are fitted in and extend through the slots 50, each being carried by a spindle 53 extending laterally from the lower end of a yoke or similar device 54, which extends vertically upward from the spindle and passes through a bracket or bearing 55 in which is journaled a stub shaft 56 provided at its outer end with a roller 57 preferably rigid with the shaft and riding upon a flange 49, as clearly shown. Springs 58 are coiled around the members of the yoke 54, between the bracket or bearing 55 and nuts or other stops 59 on the said member 54, so as to force the bracket or bearing toward the retaining roller 52 and thereby maintain the traveling roller 57 in engagement with the flange 49, as will be readily understood. The inner end of each shaft 56 is swiveled in a bracket or strap 60 which is of a bifurcated or U-shaped formation and has secured to its opposed faces the curtain guiding plates 61 which extend between and depend from the brackets and are connected at their lower ends by spacing strips 62 so that they will be maintained in parallel relation. The guiding plates 61 are preferably formed from sheet metal and in order to prevent excessive bending of the same while in operation I provide reinforcing brackets 62′, which are in the form of angle iron members extending along the edges of the plates, and transverse strips 63 at intervals secured to and extending between the said angle irons. It will be readily seen that these transverse strips and the vertically disposed angle irons impart great strength to the guiding plates and that the outstanding members of the angle irons effectually resist and overcome any tendency of the plates to bend. Owing to the great length of these plates and the fact that they depend freely from the shafts 56 which are located near their upper ends, they would bend easily under the strain to which they are subjected by the passing canvas, unless they were reinforced in an effectual manner. The bearing 55 at one side of the carriage or folder is formed on the upper end of an arm 64 rising from the adjacent bracket 60 but at the opposite side of the folder the corresponding arm, 65, carries a bearing 66 and the bearing 55 is unsupported except as it is held in place by the springs bearing thereon and the yoke playing therethrough. Secured to the shaft 56 between the said bearing 55 and the bearing 66 is a sprocket wheel 67 which is driven by a sprocket chain 68 to which motion is imparted by the sprocket wheel 69 on the shaft 34 forming part of the gearing by which the curtain 20 is actuated. It will be observed upon reference to Fig. 7 that the sprocket chain 68 passes above and below the flange 49 and around an idler 70 while to support it against sagging I provide tracks or guides 71, secured to the side plates 48 in any convenient manner, and consisting of parallel rails having grooves 72 in their opposed faces which grooves are engaged by the ends of the pins 73 secured to and projecting laterally from the sprocket chain 68, as shown. In order to bring the upper and lower runs of the chain close together so that the sprocket wheel 67 will be held in engagement therewith throughout its travel, I provide stirrups 74 adjacent the ends of the guide flanges 49 which consist of U-shaped bars or parallel pins secured in the said plates in any convenient manner, as by means of a threaded stem 75 and a nut thereon, the parallel pins or members of the U-shaped body being disposed vertically one above the other. Upon the ends of these pins are mounted rollers 76 which bear upon the upper and lower runs of the chain, as shown most clearly in Fig. 7, so that the two runs of the chain will be brought close together and consequently a positive drive for the sprocket wheel 68 will be provided around the ends 51 of the guide flange. The pins 73, working in the grooves 72, serve to support the sprocket chain in a horizontal plane so as to maintain the engagement of the chain with the driving sprocket wheel and the extremities of the tracks 71 turn slightly toward each other, as shown at 77, so as to facilitate the passage of the chain to the guides or stirrups 74 without creating excessive wear upon the ends of the tracks.

The operation of the apparatus will be readily understood from the foregoing description taken in connection with the accompanying drawings. The motor being started, motion will be imparted to the curtain through the engagement of the same by the presser rollers so that the curtain will be caused to move upwardly at the front of the frame and then down in rear of the front uprights and through the action of the folder will be arranged in superposed plies or folds upon the shelf 19, as hereinbefore stated, and as clearly shown in Fig. 1. Inasmuch as the shelf 19 is above the lowermost run of the track and is out of contact therewith, the weight of the idle portion of the curtain is removed from the lowermost track and the lower run of the curtain passing therethrough so that the movement of the curtain will be smooth and uninterrupted. Through the gearing described and illustrated motion is imparted to the folder carriage so that the shafts 56 with their rollers 57 roll upon the guide flanges 49 and consequently travel along the said flanges. As the retaining rollers 52 and their connections serve to maintain the rollers 57 in constant contact with the guide flanges the folder-carrying shafts will be caused to swing around the ends of the said flanges and alternately engage the upper and lower faces of the same. As the shafts pass downward at one end of the guide flanges the sprocket wheel 67 will be engaged successively by the upper and lower runs of the driving sprocket chain so that the motion may be continuous. The said shafts will consequently rotate continuously in one direction and move along the upper and lower faces of the guide flanges alternately the carriage consequently traveling alternately back and forth as will be readily understood. When the carriage reaches the end of the flange and is to move upwardly the upturned portion of the lower run of the driving chain will positively actuate the sprocket wheel so that the necessary lifting movement of the folder will be effected. It will be readily understood that when the folder reaches the end of the slot 50 the travel of the retaining roller 52 is arrested and the said roller then acts as a pivot about which the yoke or holding member 54 may turn and cause the folder-carrying shaft to swing to the opposite side of the guide flange, the springs 58 holding the said shaft to the flange whether the same be traveling above or below the flange. The curtain passes downwardly between the parallel plates 61 and its free portion will consequently be caused to travel back and forth through the length of the guides or tracks furnished by the flanges 49 and will therefore be arranged in folds or superposed plies, as clearly shown in Fig. 1. Inasmuch as the plates 61 are carried by yokes which are swiveled upon the shafts 56, they will remain constantly in a vertical position and that portion of the curtain depending from the folder will always be in a proper position to fold upon the previously folded portion of the curtain and as the traveling of the folder is uniform the several folds of the curtain will be equal. In this manner I am enabled to use a great length of curtain upon a relatively small frame. The rollers 21 attached to the edges of the curtain engage the inner faces of the tracks presented by the angle-irons 7 so as to hold the curtain smooth throughout its working portion, as previously stated. In order that the said rollers may be guided positively into engagement with said track notwithstanding any irregularity in the lateral alinement of the edges of the curtain when the same is folded, I provide the wedge shaped or tapered shelf 19 so that as the lowermost ply or fold of the curtain is drawn rearwardly by the presser and feeding roller 23, the guide rollers 21 will be gradually brought into engagement with the said edges of the shelf 19 and will be thereby caused to positively diverge and enter the flared terminals 18 of the tracks so as to produce the desired taut condition of the curtain.

It will be readily seen that I have provided a very efficient and durable advertising apparatus which will permit the display of many advertisements of varying sizes or an advertisement of great length which may be displayed in serial form. The electric lights 44, 45 and 46 may be arranged in any desired manner and may be of any preferred form, the illustration being merely diagrammatic. By providing rollers 42 and slats 43 at the rear of the main exposed portion of the curtain, I brace the curtain against the effect of high winds and the curtain may be further protected against damage of this sort by the window or transparent covering 13 or this transparent covering may be omitted without involving any departure from the invention. The particular mounting of the presser and feeding rollers assures constant even contact of the said rollers with the curtain so that the curtain will be positively moved without requiring an operator to be in constant attendance.

The tracks or guides for the sprocket chain 68 prevent sagging of the same and thereby maintain it in constant engagement with the sprocket wheel 67 so that there will be no interruption to the operation of the said sprocket wheel and the consequent traveling of the folder.

I have shown the sprocket wheel 67 and the chain engaging the same upon only one side of the carriage and ordinarily that arrangement is sufficient and satisfactory.

If so desired, however, the wheel and chain may be duplicated on the two sides of the carriage and other changes may be made within the scope of the appended claims.

Having thus described my invention, what I claim and desire to secure by Letters Patent is—

1. In an advertising apparatus, the combination of a frame, tracks on the frame having terminals spaced apart vertically of the frame, an endless curtain arranged to travel on the tracks, a horizontally reciprocating folder mounted on the frame between the terminals of the tracks and engaging the curtain to fold the surplus portion thereof in superposed plies adjacent the lower terminals of the tracks, means for actuating said folder, and means for moving the curtain and drawing the lowermost ply of the same into engagement with the tracks through the lower terminals thereof.

2. In an advertising apparatus, the combination of a frame, similar tracks secured to said frame at the sides thereof having upper and lower terminals and lower runs extending rearwardly from the front of the frame to said lower terminals, a shelf arranged adjacent the lower terminals of the tracks and above said lower runs thereof, a display curtain arranged to travel along said tracks and extending between the same, means arranged between the terminals of the tracks for folding the surplus length of the curtain upon the said shelf and means for drawing the lowermost fold from the shelf and through the lower terminals of the tracks.

3. In an advertising apparatus, the combination of a frame, tracks upon the said frame having flared lower terminals, a wedge-shaped shelf adjacent the said lower terminals having its sides leading thereinto, a curtain provided at its edges with rollers adapted to engage the said tracks, means for folding the surplus length of the curtain upon the said shelf, and means for moving the curtain and drawing the lowermost fold of the same toward the flared terminals of the track and causing the rollers at the edges of the curtains to enter said terminals.

4. In an advertising apparatus, the combination of a frame, tracks thereon, an endless display curtain arranged to travel along said tracks, elliptical guides mounted upon the frame between the terminals of the tracks, a folder arranged to travel along the said guides and engage the free portion of the curtain between the terminals of the tracks, and means for causing the said folder to travel continuously upon the said guides.

5. In an advertising apparatus, the combination of a frame, tracks mounted thereon, a curtain arranged to travel upon the tracks, elliptical guides disposed between the terminals of the tracks, a freely suspended folder engaging the curtain between the terminals of the tracks and arranged to travel upon the said guides, and means for actuating said folder.

6. In an advertising apparatus, the combination of a frame, a traveling curtain supported by the same, slotted guides upon the frame at the sides of the same, guide flanges around the slots in said guides, folder supporting shafts arranged to travel upon the said guide flanges, a curtain-engaging folder swiveled upon the said shafts, retaining rollers mounted in the said slots, connections between the said rollers and the shafts whereby the shafts will be held to the guide flanges and means for actuating the folder.

7. In an advertising apparatus, the combination of a frame, a traveling curtain supported thereby, slotted guide plates on the frame, flanges on said plates around the slots therein, stub shafts having their outer ends arranged to travel on said flanges, a curtain-engaging folder swiveled upon and extending between the inner ends of said shafts, means for effecting travel of said shafts upon said flanges, retaining rollers mounted in the slots in the guide plates, spindles carrying said rollers and having a slidable engagement with bearings for the shafts, and springs acting on said spindle and said bearings to hold them toward each other.

8. In an advertising apparatus, the combination of a frame, a traveling curtain supported by the same, slotted guides upon the frame at the sides of the same, guide flanges around the slots in said guides, folder supporting shafts arranged to travel upon the said guide flanges, a curtain-engaging folder swiveled upon the said shafts, retaining rollers mounted in the said slots, connections between the said rollers and the shafts whereby the shafts will be held to the guide flanges, a sprocket wheel on one of the shafts, a sprocket chain passing above and below the guide flanges and engaging the sprocket wheel, means for actuating said sprocket chain, and means above and below the flanges for guiding and supporting the sprocket chain.

9. In an advertising apparatus, the combination of a frame, a traveling curtain supported by the same, slotted guides upon the frame at the sides of the same, guide flanges around the slots in said guides, folder supporting shafts arranged to travel upon the said guide flanges, a curtain-engaging folder swiveled upon the said shafts, retaining rollers mounted in the said slots, connections between the said rollers and the shafts whereby the shafts will be held to the guide flanges, a sprocket wheel on one of the shafts, a sprocket chain passing above and below the guide flanges and engaging the sprocket wheel, means for actuating said sprocket chain, rails above and below the guide flanges having longitudinal grooves in their opposed faces, and pins projecting laterally from the sprocket chain and engaging said grooves.

10. In an advertising apparatus, the combination of a frame, a traveling curtain supported by the same, slotted guides upon the frame at the sides of the same, guide flanges, around the slots in said guides, folder supporting shafts arranged to travel upon the said guide flanges, a curtain-engaging folder swiveled upon the said shafts, retaining rollers mounted in the said slots, connections between the said rollers and the shafts whereby the shafts will be held to the guide flanges, a sprocket wheel on one of the shafts, a sprocket chain passing above and below the guide flanges and engaging the sprocket wheel, means for actuating said sprocket chain, means above and below the flanges for guiding and supporting the sprocket chain, and devices embracing the upper and lower runs of the chain to cause the same to approach adjacent the ends of the guide flanges.

11. In an advertising apparatus, the combination of a frame, tracks upon the frame having upper and lower terminals, a shelf adjacent the lower terminals and having its sides leading to said lower terminals, a curtain, guides on the edges of the curtain adapted to engage the tracks and the sides of the shelf, means for folding the surplus length of the curtain upon the shelf, and means for moving the curtain whereby the guides will move along the sides of the shelf and into engagement with the tracks.

12. In an advertising apparatus, the combination of a frame, tracks thereon, a display curtain arranged to travel along said tracks, elliptical guides on the frame between the terminals of the tracks, a folder arranged to travel along said guides and engage the free portion of the curtain between the terminals of the tracks, means for causing the folder to travel continuously along the guides, and means for holding the folder to the guides.

In testimony whereof I affix my signature, in presence of two witnesses.

ROBERT ATWELL HARRIS.

Witnesses:
W. J. WARD,
J. O. DRAKE.

---

Copies of this patent may be obtained for five cents each, by addressing the "Commissioner of Patents, Washington, D. C."